JOSEPH GIBBS.
Culinary Boiler.

No. 123,820.

Patented Feb. 20, 1872.

Witnesses:
Gustave Dieterich
Alex F. Roberts

Inventor:
J. Gibbs
PER
Attorneys.

123,820

UNITED STATES PATENT OFFICE.

JOSEPH GIBBS, OF OPELOUSAS, LOUISIANA.

IMPROVEMENT IN CULINARY-BOILERS.

Specification forming part of Letters Patent No. 123,820, dated February 20, 1872.

Specification describing certain Improvements in Culinary-Boilers, invented by JOSEPH GIBBS, of Opelousas, in the parish of St. Landry, and State of Louisiana.

My invention consists in a boiler having a wide flange adapted for supporting it on the top of pots or sauce-pans of different sizes, so that the body of the boiler sets down on the pot or sauce-pan to be heated by the water boiled therein, with which boiler is combined a circular weight, adapted to rest on the top of the flange, and press it down upon the edge of the pot so hard as to prevent the escape of the steam from the pot as readily as it would without said weight.

Figure 1:
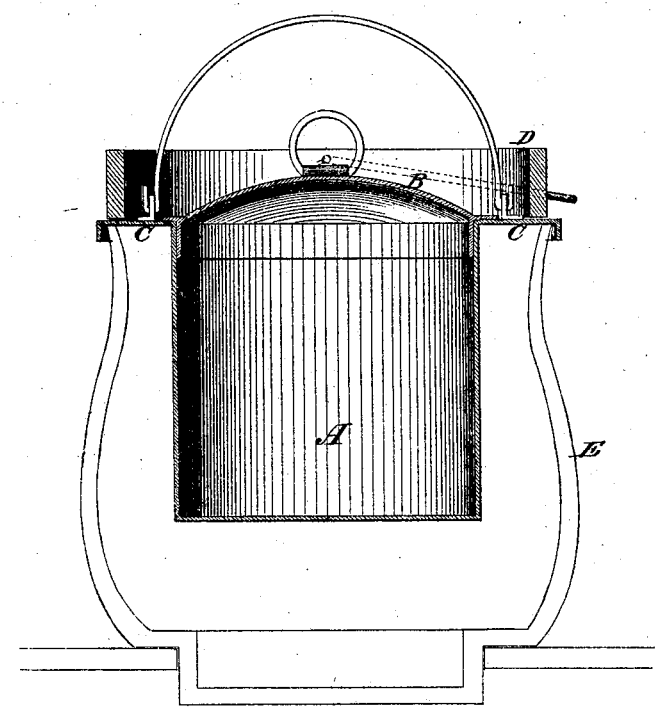
Figure 2:
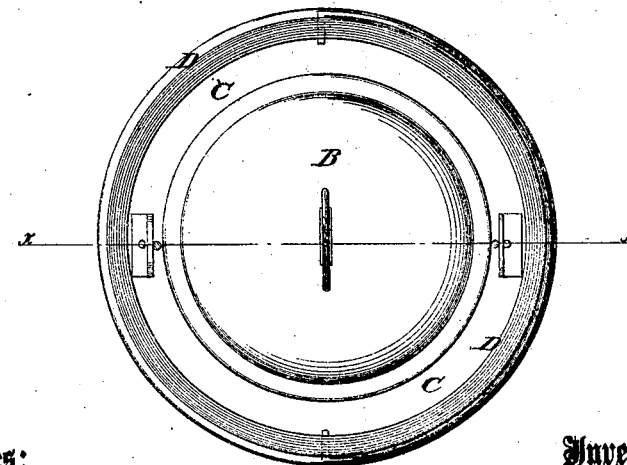

Figure 1 is a sectional elevation of my improved culinary-boiler, and Fig. 2 is top view.

A is a sheet-metal boiler, with a close-fitting convex cover, B, and a wide horizontal flange, C, and D is the ring-shaped weight, which I propose to use upon the top of the flange C, as indicated in the drawing.

The boiler is placed on the pot or sauce-pan E, as shown, to confine the steam in the pot E as much as possible. This boiler, containing the substance to be cooked, and the requisite amount of water for the purpose, is placed in the pot E, as ordinary steamers are used, and the water boiled in it by the heat communicated to it by the steam generated in pot E, so that the articles cooked in said boiler will be protected against burning when the water boils out.

My improved boiler differs from the ordinary steamers, in not having holes in the body to admit the steam from pot E to it; also in having the broad flange C, whereby it is adapted to fit on pots of different sizes, and to suspend the whole of the said vessel A except the top in the pot. The weight D serves to keep the steam in pot E to a greater extent than it would be without said weight.

Having thus described my invention, I claim as new and desire to secure by Letters Patent—

The combination of boiler A, cover B, flange C, and weight D, as and for the purpose described.

JOSEPH GIBBS.

Witnesses:
  R. BEUGUEREL,
  S. P. CLARK.